US012657886B2

(12) United States Patent　(10) Patent No.:　US 12,657,886 B2
Luu et al.　(45) Date of Patent:　Jun. 16, 2026

(54) MACHINE LEARNING MODEL TRAINING FRAMEWORK FOR MULTI-FRAME IMAGE PROCESSING

(71) Applicant: Samsung Electronics Co., Ltd., Suwon-si (KR)

(72) Inventors: Tyler Luu, Richardson, TX (US); John W. Glotzbach, Allen, TX (US); Hamid R. Sheikh, Allen, TX (US); John Seokjun Lee, Allen, TX (US); Youngmin Kim, Seongnam (KR); Jun Ki Cho, Suwon-si (KR); Seung-Chul Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 18/045,558

(22) Filed: Oct. 11, 2022

(65) Prior Publication Data

US 2023/0252770 A1　Aug. 10, 2023

Related U.S. Application Data

(60) Provisional application No. 63/306,749, filed on Feb. 4, 2022.

(51) Int. Cl.
　*G06V 10/774*　(2022.01)
　*G06T 5/50*　(2006.01)
　　(Continued)

(52) U.S. Cl.
　CPC ........... *G06V 10/7747* (2022.01); *G06T 5/50* (2013.01); *G06T 5/70* (2024.01); *G06T 5/80* (2024.01);
　　(Continued)

(58) Field of Classification Search
　CPC .... G06T 5/50; G06T 5/70; G06T 5/80; G06T 2207/10144; G06T 2207/20221;
　　(Continued)

(56) References Cited

U.S. PATENT DOCUMENTS

| | | | |
|---|---|---|---|
| 10,805,649 B2 | 10/2020 | Pekkucuksen et al. | |
| 10,911,691 B1 | 2/2021 | Le et al. | |

(Continued)

OTHER PUBLICATIONS

Kalantari, N. K., & Ramamoorthi, R. (2017). Deep high dynamic range imaging of dynamic scenes. ACM Transactions on Graphics, 36(4), 1-12. https://doi.org/10.1145/3072959.3073609 (Year: 2017).*

(Continued)

*Primary Examiner* — Gregory A Morse
*Assistant Examiner* — David Alexander Wambst

(57)　ABSTRACT

A method for training data generation includes obtaining a first set of image frames of a scene and a second set of image frames of the scene using multiple exposure settings. The method also includes generating an alignment map, a blending map, and an input image using the first set of image frames. The method further includes generating a ground truth image using the alignment map, the blending map, and the second set of image frames. In addition, the method includes using the ground truth image and the input image as an image pair in a training dataset when training a machine learning model to reduce image distortion and noise.

21 Claims, 7 Drawing Sheets

(51) Int. Cl.
  *G06T 5/70* (2024.01)
  *G06T 5/80* (2024.01)
  *G06V 10/24* (2022.01)
(52) U.S. Cl.
  CPC .... *G06V 10/24* (2022.01); *G06T 2207/10144* (2013.01); *G06T 2207/20081* (2013.01); *G06T 2207/20221* (2013.01)
(58) Field of Classification Search
  CPC ............. G06T 2207/20081; G06T 5/60; G06T 2207/20084; G06V 10/24
  See application file for complete search history.

(56) References Cited

U.S. PATENT DOCUMENTS

| | | | |
|---|---|---|---|
| 10,944,914 B1 | 3/2021 | Le et al. | |
| 11,064,129 B2 | 7/2021 | Kenjo | |
| 11,107,205 B2 | 8/2021 | Hu et al. | |
| 11,128,809 B2 | 9/2021 | Zhen et al. | |
| 11,776,091 B1 * | 10/2023 | Molholm | G06N 3/045 |
| | | | 382/157 |
| 2019/0043178 A1 | 2/2019 | Chen et al. | |
| 2019/0333198 A1 * | 10/2019 | Wang | G06T 5/70 |
| 2020/0285883 A1 | 9/2020 | Hiasa | |
| 2021/0158139 A1 | 5/2021 | Mai et al. | |
| 2021/0314474 A1 | 10/2021 | Yang et al. | |

OTHER PUBLICATIONS

Chen, I. (Oct. 25, 2019). What is ISO in photography & why is it important? | Adobe. Www.adobe.com. https://www.adobe.com/creativecloud/photography/discover/iso.html (Year: 2019).*

Zhou, T., Lee, Y., Davis, U., Yu, S., & Efros, A. (2015). FlowWeb: Joint Image Set Alignment by Weaving Consistent, Pixel-wise Correspondences. https://openaccess.thecvf.com/content_cvpr_2015/papers/Zhou_FlowWeb_Joint_Image_2015_CVPR_paper.pdf (Year: 2015).*

Szeliski , R. (2007). Image Alignment and Stitching: A Tutorial. Foundations and Trends® in Computer Graphics and Vision, 2(1), 1-104. https://doi.org/10.1561/0600000009 (Year: 2007).*

Chen, C., Chen, Q., Xu, J., & Koltun, V. (2018). Learning to See in the Dark. ArXiv:1805.01934 [Cs]. https://arxiv.org/abs/1805.01934 (Year: 2018).*

Wronski, B., Garcia-Dorado, I., Ernst, M., Kelly, D., Krainin, M., Liang, C.-K., Levoy, M., & Milanfar, P. (2021). Handheld multi-frame super-resolution. ACM Transactions on Graphics, 38(4). https://doi.org/10.1145/3306346.3323024 (Year: 2021).*

Ram, P. K., Sai, S. V., & Venkatesh, B. R. (2017). DeepFuse: A Deep Unsupervised Approach for Exposure Fusion with Extreme Exposure Image Pairs. ArXiv.org. https://arxiv.org/abs/1712.07384 (Year: 2017).*

Yan, Q., Gong, D., Javen Qinfeng Shi, Van den Hengel, A., Shen, C., Reid, I., & Zhang, Y. (2021). Dual-Attention-Guided Network for Ghost-Free High Dynamic Range Imaging. International Journal of Computer Vision, 130(1), 76-94. https://doi.org/10.1007/s11263-021-01535-y (Year: 2021).*

International Search Report and Written Opinion of the International Searching Authority dated May 19, 2023 in connection with International Patent Application No. PCT/KR2023/001343, 7 pages.

* cited by examiner

600

START

OBTAIN MULTIPLE IMAGE FRAMES OF SCENE DURING MULTI-FRAME CAPTURE OPERATION ~602

GENERATE BLENDED IMAGE USING MULTIPLE IMAGE FRAMES ~604

REDUCE IMAGE DISTORTION AND NOISE IN BLENDED IMAGE USING TRAINED MACHINE LEARNING MODEL ~606

STORE, OUTPUT, OR USE FINALIZED OUTPUT IMAGE ~608

END

MACHINE LEARNING MODEL TRAINING FRAMEWORK FOR MULTI-FRAME IMAGE PROCESSING

CROSS-REFERENCE TO RELATED APPLICATION AND PRIORITY CLAIM

This application claims priority under 35 U.S.C. § 119(e) to U.S. Provisional Patent Application No. 63/306,749 filed on Feb. 4, 2022. This provisional patent application is hereby incorporated by reference in its entirety.

TECHNICAL FIELD

This disclosure relates generally to imaging systems. More specifically, this disclosure relates to a machine learning model training framework for multi-frame image processing.

BACKGROUND

Many mobile electronic devices, such as smartphones and tablet computers, include cameras that can be used to capture still and video images. Such devices have become prevalent for capturing, uploading, and sharing digital images. While convenient, cameras on mobile electronic devices typically suffer from a number of shortcomings. For example, capturing images in low-light settings with cameras on mobile electronic devices can create large amounts of noise in the images, which can be due to an increase in the light sensitivity of the cameras' sensors. As ambient light is reduced, the amount of noise increases. When the amount of noise is high, image quality for the end user is degraded. Additionally, users taking pictures with cameras on mobile electronic devices commonly hold the electronic devices by hand, and even the most careful user inevitably introduces small camera motions due to handshake. The amount of handshake increases during long exposure scenarios that can occur in reduced light situations. When the amount of handshake is high, a significant amount of frame blur can be introduced into an image frame. Image blur further degrades image quality for the end user.

SUMMARY

This disclosure provides a machine learning model training framework for multi-frame image processing.

In a first embodiment, a method for training data generation includes obtaining a first set of image frames of a scene and a second set of image frames of the scene using multiple exposure settings. The method also includes generating an alignment map, a blending map, and an input image using the first set of image frames. The method further includes generating a ground truth image using the alignment map, the blending map, and the second set of image frames. In addition, the method includes using the ground truth image and the input image as an image pair in a training dataset when training a machine learning model to reduce image distortion and noise.

In a second embodiment, an electronic device includes at least one processing device configured to obtain a first set of image frames of a scene and a second set of image frames of the scene using multiple exposure settings. The at least one processing device is also configured to generate an alignment map, a blending map, and an input image using the first set of image frames. The at least one processing device is further configured to generate a ground truth image using the alignment map, the blending map, and the second set of image frames. In addition, the at least one processing device is configured to use the ground truth image and the input image as an image pair in a training dataset when training a machine learning model to reduce image distortion and noise.

In a third embodiment, a non-transitory machine-readable medium contains instructions that when executed cause at least one processor of an electronic device to obtain a first set of image frames of a scene and a second set of image frames of the scene using multiple exposure settings. The non-transitory machine-readable medium also contains instructions that when executed cause the at least one processor to generate an alignment map, a blending map, and an input image using the first set of image frames. The non-transitory machine-readable medium further contains instructions that when executed cause the at least one processor to generate a ground truth image using the alignment map, the blending map, and the second set of image frames. In addition, the non-transitory machine-readable medium contains instructions that when executed cause the at least one processor to use the ground truth image and the input image as an image pair in a training dataset when training a machine learning model to reduce image distortion and noise.

In a fourth embodiment, an electronic device includes at least one imaging sensor. The electronic device also includes at least one processing device configured to obtain, using the at least one imaging sensor, multiple image frames of a scene during a multi-frame capture operation. The at least one processing device is also configured to generate a blended image using the multiple image frames. The at least one processing device is further configured to reduce image distortion and noise in the blended image using a trained machine learning model. The trained machine learning model is trained using multiple image pairs, where each of the image pairs includes (i) an input image generated from a first set of image frames using an alignment map and a blending map generated from the first set of image frames and (ii) a ground truth image generated from a second set of image frames using the alignment map and the blending map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
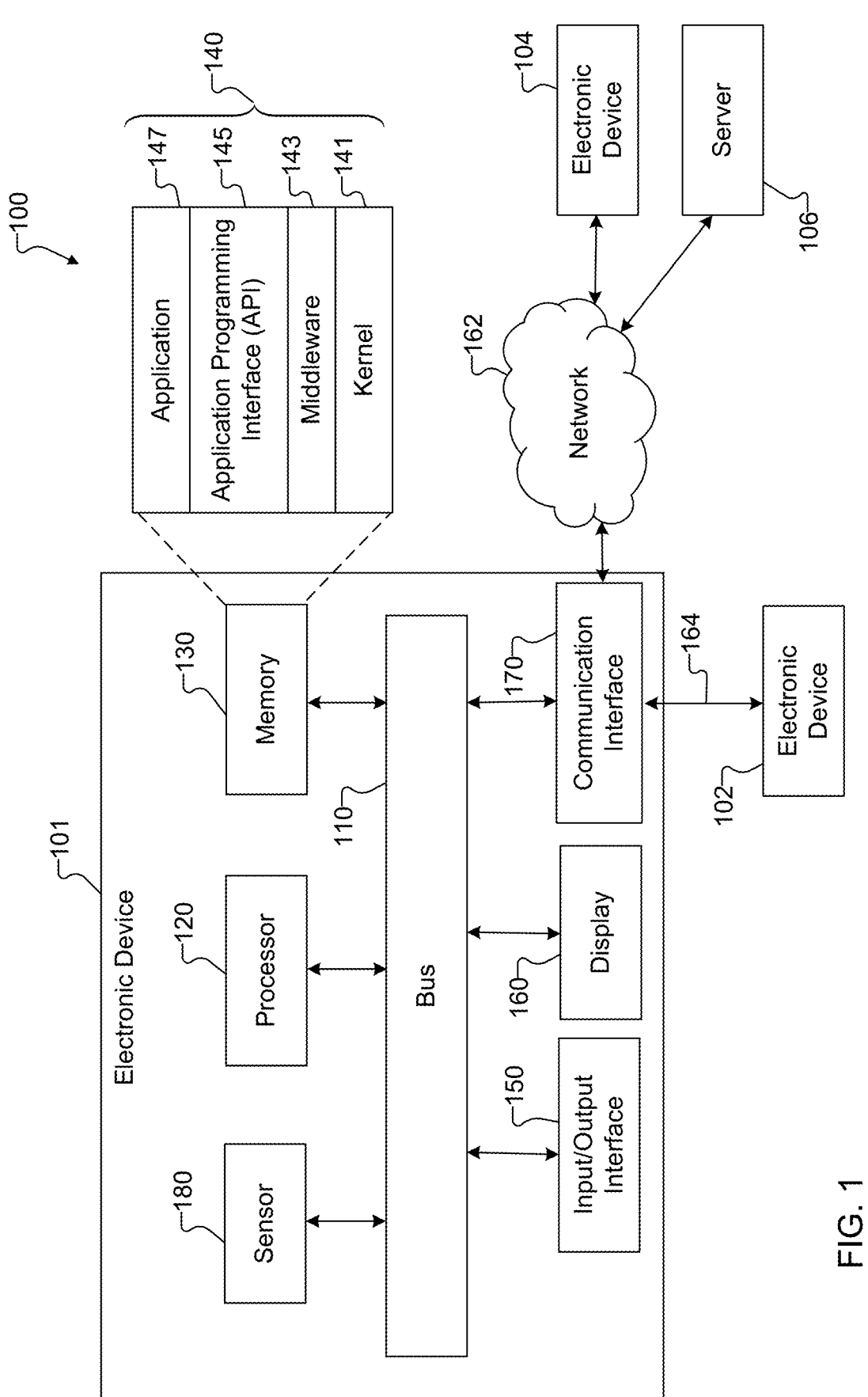
FIG. 1 illustrates an example network configuration including an electronic device in accordance with this disclosure.

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system or device.

As noted above, many mobile electronic devices, such as smartphones and tablet computers, include cameras that can be used to capture still and video images. Such devices have become prevalent for capturing, uploading, and sharing digital images. While convenient, cameras on mobile electronic devices typically suffer from a number of shortcomings. For example, capturing images in low-light settings with cameras on mobile electronic devices can create large amounts of noise in the images, which can be due to an increase in the light sensitivity of the cameras' sensors. As ambient light is reduced, the amount of noise increases.

When the amount of noise is high, image quality for the end user is degraded. Additionally, users taking pictures with cameras on mobile electronic devices commonly hold the electronic devices by hand, and even the most careful user inevitably introduces small camera motions due to handshake. The amount of handshake increases during long exposure scenarios that can occur in reduced light situations. When the amount of handshake is high, a significant amount of frame blur can be introduced into an image frame. Image blur further degrades image quality for the end user.

An electronic device can perform a number of image processing functions to capture images. Some electronic devices can support the use of multi-frame processing (MFP) operations to provide higher image quality to users. MFP operations enable an electronic device to capture and combine multiple image frames in order to produce higher quality images. Image quality improvements, such as high dynamic range (HDR), low-light photography, and motion blur reduction, are enabled based on the use of MFP operations. MFP operations generally include a multi-frame capture operation, an alignment operation, and a blending operation. The multi-frame capture operation captures multiple image frames of a scene, the alignment operation aligns the multiple image frames, and the blending operation blends the aligned image frames to generate a single output image frame. As a particular example, the multiple image frames can be analyzed in order to generate an alignment map for aligning the image frames. Also, a blending map can be generated and used to blend the aligned image frames and produce a single output image frame.

Machine learning technology has been applied recently to various aspects of image processing, such as denoising, motion deblur, HDR, segmentation, disparity estimation, and the like. As a particular example, an artificial intelligence (AI)-based image signal processing (ISP) operation can be implemented for demosaicing, denoising, and image sharping. In order to train an AI-based ISP operation, multiple image pairs are often required, where one image in each pair is a noisy (training) image and another image in each pair is a cleaner (ground truth) image. The training images and the ground truth images are used as inputs for training a machine learning model to remove image noise. In order to train an AI-based ISP operation, multiple image pairs generated using an MFP operation are often needed. If the noisy images are captured with high ISO in low-light settings and ground truth images are stationary images with low ISO, an AI-based ISP operation can be trained to remove noise from the high ISO images.

Unfortunately, creating realistic training data is challenging due to differences in image pairs that can be introduced during MFP operations. Some of the challenges of implementing a machine learning-based image processing operation include how to collect, prepare, and generate training data. As a particular example of this, an MFP operation can align noisy images differently than it aligns ground truth images. Similarly, an MFP operation can blend aligned noisy images differently than it blends aligned ground truth images. When misalignment and blending differences are introduced between image pairs, many of the image pairs are not useful for training a machine learning model.

Embodiments of this disclosure describe various techniques to create training data for use in training a machine learning model to reduce image distortion and noise. As described in more detail below, an MFP operation is used to obtain multiple image pairs. For example, the MFP operation can generate alignment maps using noisy images and apply the alignment maps to both noisy and ground truth images in order to provide similar alignments between the images of image pairs. Additionally, the MFP operation can generate blending maps using the aligned noisy images and apply the blending maps to both the aligned noisy images and the aligned ground truth images. Using the same alignment maps and the same blending maps results in image pairs with similar alignments and blending. The ground truth images and the noisy images represent image pairs in a dataset that can be used to train a machine learning model. Once trained, the machine learning model can be used to reduce image distortion and noise, such as image distortion and noise introduced in low-light photography on an end user device.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 can receive image data captured by at least one camera or other imaging sensor and can process the image data to generate training data for use in training a machine learning model. Also or alternatively, the processor 120 can process image data captured by at least one camera or other imaging sensor using a trained machine learning model to reduce image distortion and noise in the image data.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for generating training data for training a machine learning model and/or using a trained machine learning model to process captured image data. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 can receive image data and can process the image data to generate training data for use in training a machine learning model. Also or alternatively, the server 106 can process image data using a trained machine learning model to reduce image distortion and noise in the image data.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
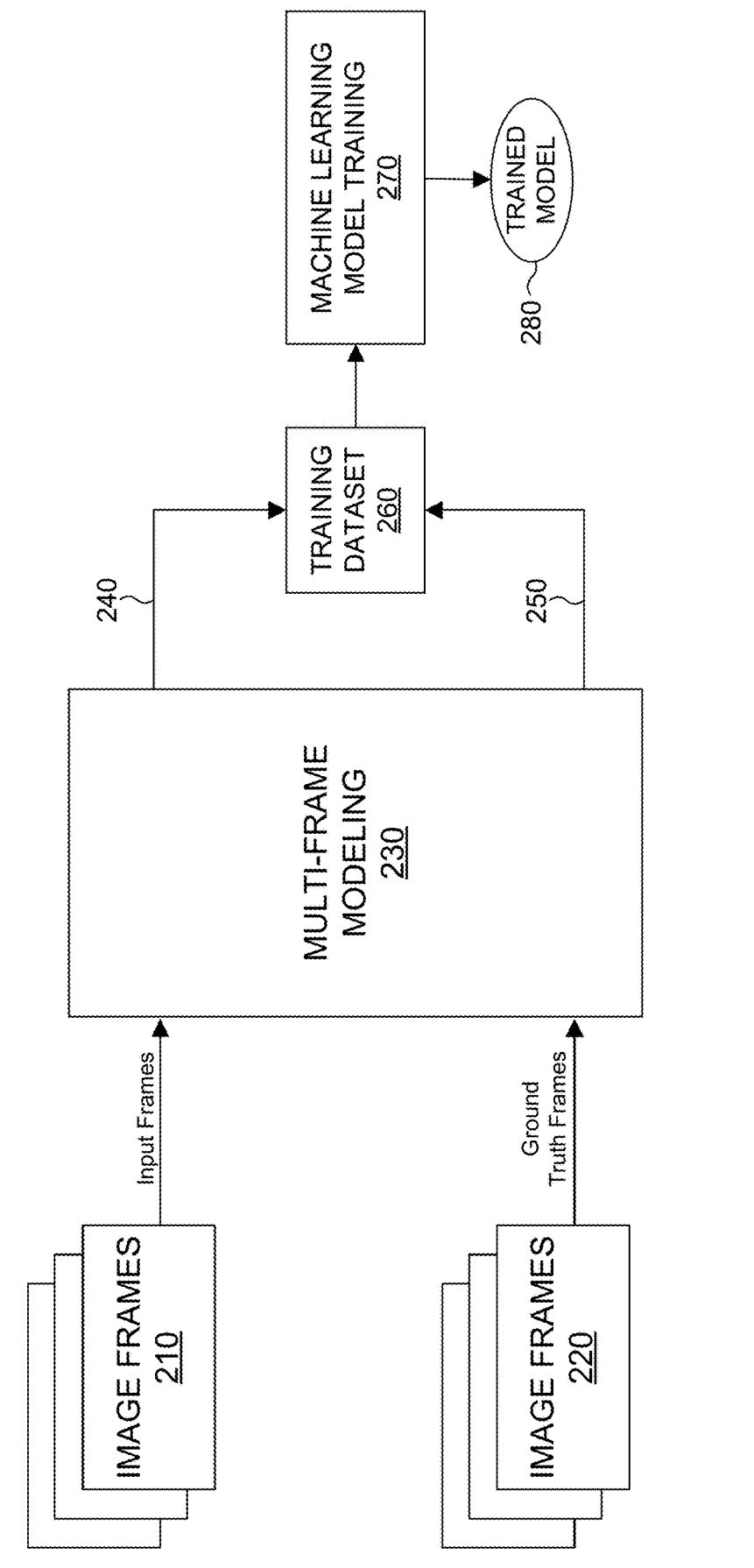
FIGS. 2A and 2B illustrate an example process for generating training data for training a machine learning model to reduce image distortion and noise in accordance with this disclosure.
Figure 2B:
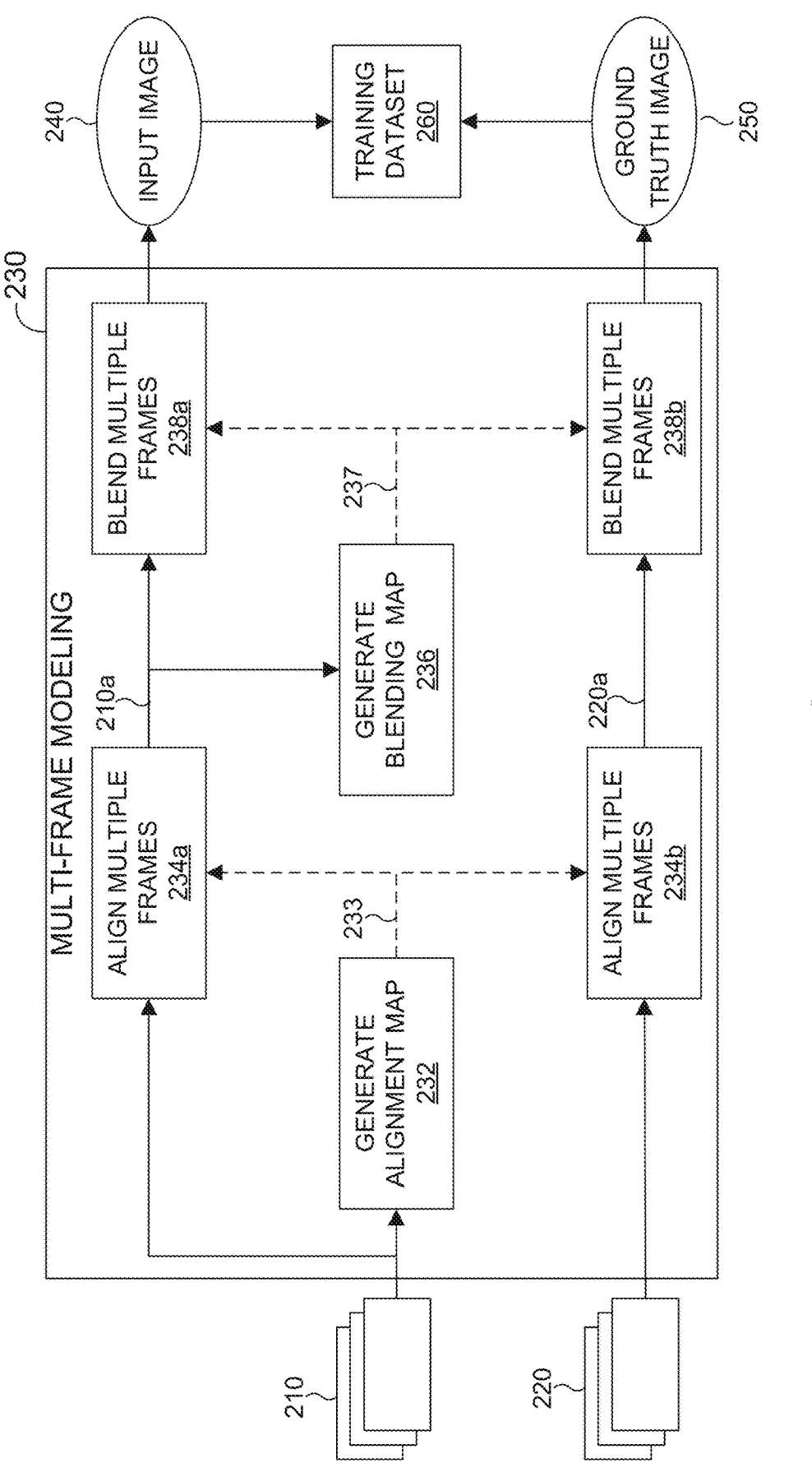

FIGS. 2A and 2B illustrate an example process 200 for generating training data for training a machine learning model to reduce image distortion and noise in accordance with this disclosure. For ease of explanation, the process 200 is described as being performed by the server 106 in the network configuration 100 shown in FIG. 1. However, the process 200 could be performed using any other suitable device(s) and in any other suitable system (s), such as when performed by the electronic device 101.

As shown in FIG. 2A, the process 200 is generally used to capture or otherwise obtain multiple image frames 210 and 220 of one or more scenes and to process the image frames 210 and 220 in order to generate a training dataset 260 for a machine learning model training operation 270. Among other things, the training dataset 260 may include multiple image pairs of different scenes, different lighting conditions, different exposure settings, and the like. Additionally, some of the images included in the training dataset 260 may include additional noise based on particular imaging sensors, such as one or more sensors 180 of the electronic device 101. Depending on the implementation, the process 200 may receive one image frame 210 and one image frame 220 or multiple image frames 210 and multiple image frames 220. The image frames 210 and 220 may be obtained in any suitable manner. For example, the image frames 210 and 220 can be captured by at least one camera or other imaging sensor, such as one or more sensors 180 in FIG. 1. As another example, the image frames 210 and 220 can be obtained from an information repository, such as the memory 130 of FIG. 1. As yet another example, the image frames 210 can be synthetically generated using the image frames 220, such as by adding image distortion and noise to the image frames 220.

In some embodiments, the image frames 210 may be captured using high ISO values, such as during image capture operations in one or more low-light environments. The image frames 210 can also be captured while an image capture device is handheld or while the image capture device is positioned on a tripod or other mechanism to safeguard against motion. Additionally, the image frames 210 may be captured using a common exposure setting or different exposure settings, such as different ISO settings, different exposure times, or both. For example, the image frames 210 can be captured using the same ISO value but different exposure times. As another example, the image frames 210 can be captured using different ISO values and different exposure times. In particular embodiments, the image frames 210 may be captured using high ISO settings representing real-life conditions in low-light environments. In some cases, the image frames 210 may be captured using shorter exposure times, which can be possible when the ISO level is increased. Using high ISO generally increases the amount of noise within captured image frames. In some instances, one or more cameras or other imaging sensors (such as one or more sensors 180 in FIG. 1) can be controlled during a multi-frame capture operation so that the image frames 210 are captured rapidly, like in a burst mode. In other instances, if multiple cameras or other imaging sensors (such as multiple sensors 180 in FIG. 1) are available, the image frames 210 may be captured simultaneously or in an overlapping manner.

In some embodiments, the image frames 220 may be captured using low ISO values. The image frames 220 can also be captured while an image capture device is positioned on a tripod or other mechanism to safeguard against motion. Additionally, the image frames 220 may be captured using a common exposure setting or different exposure settings, such as different ISO settings, different exposure times, or both. For example, the image frames 220 can be captured using the same ISO value but different exposure times. As another example, the image frames 220 can be captured using different ISO values and different exposure times. The image frames 220 may be captured using low ISO settings for noise reduction. For instance, an ISO value of 50 can be used for some or all of the image frames 220. In some cases, the image frames 220 may be captured using longer exposure times, which can be possible when the ISO level is low and a tripod or other mechanism is used to help to reduce motion. Using low ISO and longer exposure times generally decreases the amount of noise within captured image frames. In some instances, one or more cameras or other imaging sensors (such as one or more sensors 180 in FIG. 1) can be controlled during a multi-frame capture operation so that the image frames 220 are captured rapidly, like in a burst mode. In other instances, if multiple cameras or other imaging sensors (such as multiple sensors 180 in FIG. 1) are available, the image frames 220 may be captured simultaneously or in an overlapping manner.

The image frames 210 represent noisy images (also referred to as input or training images), while the image frames 220 represent cleaner images (also referred to as ground truth images). The image frames 210 can be captured using one or more higher ISO values, and the image frames 220 can be captured using one or more lower ISO values. The image frames 220 can be captured using a tripod or other mechanism to safeguard against motion during longer exposures to reduce motion blur in the image frames 220. In some embodiments, the image frames 210 and 220 includes different sets of image frames. Each set of image frames 210 or 220 may capture the same scene using the same aperture and lens, while the exposure settings (such as ISO values and exposure times) between the image frames 210 or 220 in the set can vary.

A capture request that triggers the capture of the image frames 210 or 220 represents any suitable command or input indicating a need or desire to capture at least one image frame of a scene. For example, the capture request could be initiated in response to a user's pressing of a "soft" button presented on the display 160 or the user's pressing of a "hard" button. The multi-frame capture operation can capture one or more image frames for each capture request. For instance, the multi-frame capture operation can capture five to ten image frames for a single capture request, where each of the captured image frames can be based on differing exposure settings.

The image frames 210 and 220 are provided to an MFP modeling operation 230, which generally operates to process the image frames 210 and 220 in order to generate a single input image 240 from each set of image frames 210 and a single ground truth image 250 from each set of image frames 220. For example, the MFP modeling operation 230 can align and blend or otherwise combine pixels from the image frames 210 in order to produce a blended image of the scene denoted as the input image 240. The MFP modeling operation 230 can also align and blend or otherwise combine pixels from the image frames 220 in order to produce a blended image of the scene denoted as the ground truth image 250. Each input image 240 and its associated ground truth image 250 are provided as an image pair in the training dataset 260, which may be stored in a suitable memory or other storage location(s). The image pairs here can correspond to different scenes, different light conditions, and the like. In some embodiments, the MFP modeling operation 230 is a Bayer MFP simulator.

The image pairs that are included in the training dataset 260 can be provided to the machine learning model training operation 270, which generally operates to train at least one machine learning model 280. For example, the training operation 270 may be used to train one or more neural networks, such as one or more convolution neural networks (CNNs), or other machine learning models 280. The machine learning model 280 is trained here to remove image distortions from image frames, such as noise from image frames captured in a low-light environment. For instance, after the machine learning model 280 is trained, an electronic device can capture one or more image frames, and the trained machine learning model 280 can be used to reduce noise from the one or more image frames.

As shown in FIG. 2B, the MFP modeling operation 230 is generally used to generate an input image 240 and a ground truth image 250 from a set of image frames 210 and a set of image frames 220, respectively. In this example, the MFP modeling operation 230 includes an alignment map generation operation 232, which analyzes the image frames 210 and generates an alignment map 233 based on the image frames 210. The alignment map generation operation 232 may use any suitable technique to generate an alignment map 233, such as by identifying how common objects or points differ in the image frames 210.

The MFP modeling operation 230 also includes multiple frame alignment operations 234a-234b. The frame alignment operation 234a aligns the image frames 210 using the generated alignment map 233 to generate aligned image frames 210a. Similarly, the frame alignment operation 234b aligns the image frames 220 using the generated alignment map 233 to generate aligned image frames 220a. The frame alignment operations 234a-234b may use any suitable technique to generate aligned image frames, such as by warping the image frames 210 or 220 based on the alignment map 233.

The aligned image frames 210a are provided to a blending map generation operation 236, which analyzes the aligned image frames 210a and generates a blending map 237. The blending map 237 can identify which portions of the image frames 210a or 220a will or will not be blended together. As a particular example, portions of image frames containing little or no motion may be blended together, while portions of image frames containing motion may not be blended (in which case image data from a single image frame may be used to avoid the creation of motion blur). The blending map generation operation 236 may use any suitable technique to generate blending maps, such as by performing motion estimation and generating blending weights based on the presence or absence of motion.

The aligned image frames 210a and 220b are respectively provided to frame blending operations 238a-238b, each of which blends the aligned image frames 210a or 220a based on the generated blending map 237. For example, the frame blending operation 238a blends the aligned image frames 210a to produce the input image 240, and the frame blending operation 238b blends the aligned image frames 220a to produce the ground truth image 250. The frame blending operation 238a or 238b may use any suitable technique to blend aligned image frames, such as by performing weighted combinations of pixels from the aligned image frames 210a or 220b (where the weights are based on the blending map 237).

Using the same alignment map 233 on both sets of image frames 210 and 220 helps to safeguard against misalignment that may occur if each of the image sets is used to generate a separate alignment map. Also, using the same blending map 237 on both sets of image frames 210a and 220a helps to safeguard against blending differences that may occur if each of the image sets is used to generate a separate blending map. As a result, by using the same alignment map 233 and the same blending map 237 to generate the input image 240 and the ground truth image 250, a similar alignment and a similar brightness can exist between the input image 240 and the ground truth image 250. The input image 240 and the ground truth image 250 are provided as an image pair in the training dataset 260.

Although FIGS. 2A and 2B illustrate one example of a process 200 for generating training data for training a machine learning model to reduce image distortion and noise, various changes may be made to FIGS. 2A and 2B. For example, any additional desired functions may be performed as part of the process 200 or as part of a larger image processing algorithm. As a particular example, image frames may undergo suitable pre-processing and post-processing operations.

Figure 3:
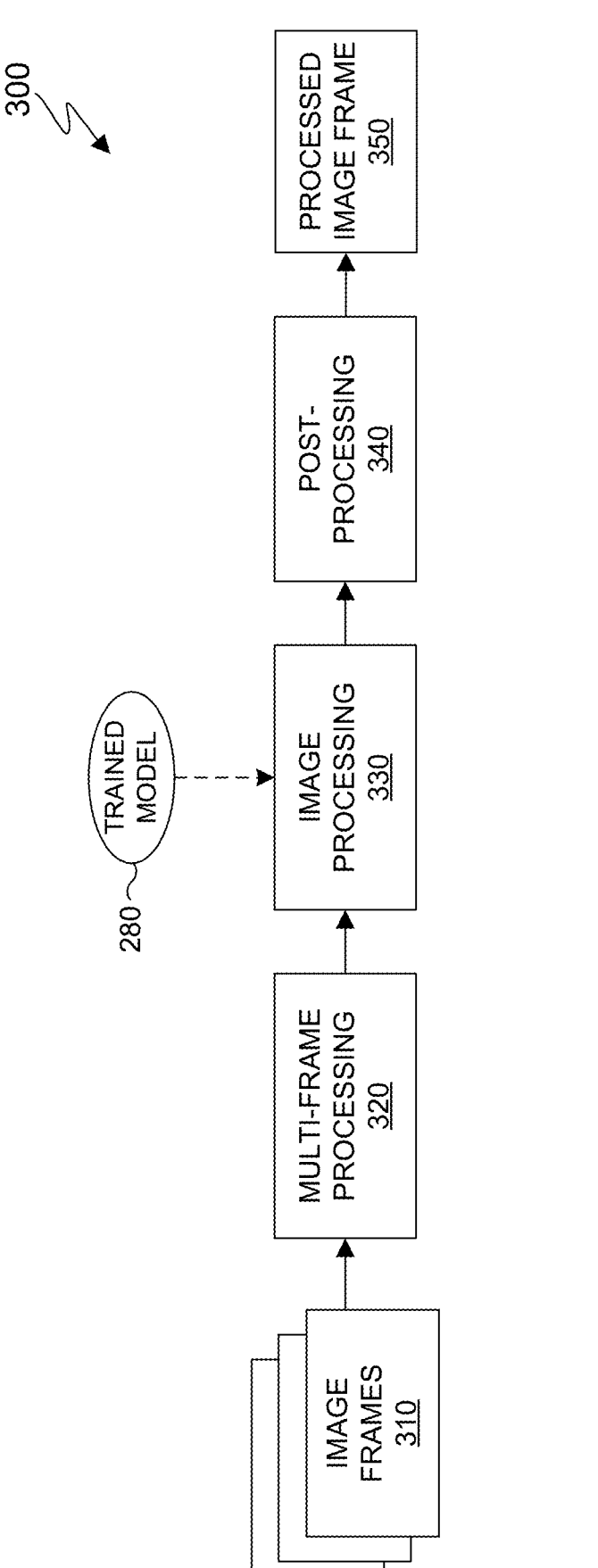
FIG. 3 illustrates an example process for image processing using a trained machine learning model in accordance with this disclosure.

FIG. 3 illustrates an example process 300 for image processing using a trained machine learning model in accordance with this disclosure. For ease of explanation, the process 300 is described as being performed by the electronic device 101 in the network configuration 100 shown in FIG. 1. However, the process 300 could be performed using any other suitable device(s) and in any other suitable system (s), such as when performed by the server 106.

As shown in FIG. 3, the electronic device 101 obtains multiple image frames 310 of a scene, such as when the processor 120 obtains multiple image frames 310 captured using at least one sensor 180 of the electronic device 101. In some cases, the image frames 310 may be captured in a low-light setting using a high ISO value, which introduces noise into the captured image frames 310. The image frames 310 include at least a first image frame and a second image frame. The first and second image frames can be captured using a multi-frame capture operation and may or may not include the use of different exposure times or other exposure settings.

The electronic device 101 performs an MFP operation 320 to generate a single blended image from the multiple image frames 310. For example, the MFP operation 320 can analyze the image frames 310 to generate an alignment map and align the image frames 310 using the alignment map. Also, the MFP operation 320 can generate a blending map that indicates motion between individual pixels of the aligned image frames and use the blending map to blend the aligned image frames to generate a single image frame. These operations may be the same as or similar to corresponding operations described above with respect to FIG. 2B.

The electronic device 101 performs an image processing operation 330 using the single image frame output from the MFP operation 320. In particular, the image processing operation 330 uses a trained machine learning model 280 to reduce image distortion and noise, such as image distortion and noise caused by using a high ISO value in a low-light environment. As noted above, the trained machine learning model 280 can be trained using ground truth images and input images generated using the process 200. A denoised image frame produced by the image processing operation 330 may include any suitable image data, such as 12-bit or 16-bit RGB image data.

The denoised image frame is provided to a post-processing operation 340, which generally performs any desired post-processing operation or operations to generate a processed image frame 350. In some embodiments, the post-processing operation 340 can enhance the sharpness of the image, scale the image, crop the image, perform additional noise filtering on the image, perform tone mapping on the image, or the like. The processed image frame 350 produced by the post-processing operation 340 may include any suitable image data, such as 8-bit YUV image data.

Although FIG. 3 illustrates one example of a process 300 for image processing using a trained machine learning model, various changes may be made to FIG. 3. For example, any additional desired functions may be performed as part of the process 300 or as part of a larger image processing algorithm. As a particular example, image frames may undergo any other suitable pre-processing and post-processing operations.

Figure 4B:
FIGS. 4A and 4B illustrate example image processing results obtained using a trained machine learning model in accordance with this disclosure.
Figure 4A:
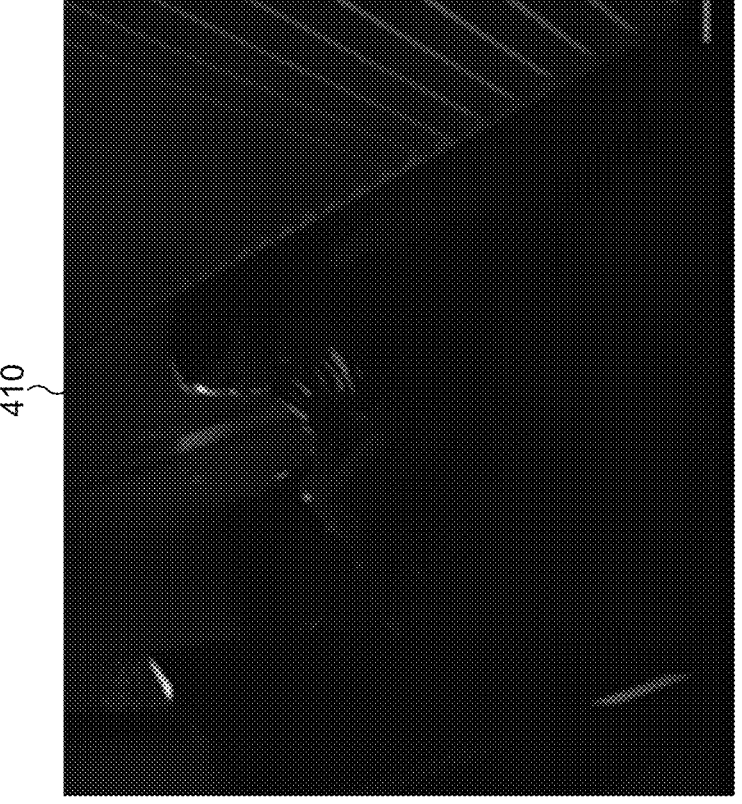

FIGS. 4A and 4B illustrate example image processing results obtained using a trained machine learning model in accordance with this disclosure. More specifically, FIGS. 4A and 4B illustrate an example image frame 410 and an example processed image frame 420. For ease of explanation, the image frames 410, 420 are described with reference to the electronic device 101 in the network configuration 100 shown in FIG. 1. However, the image frames 410, 420 could be used with any other suitable device(s) and in any other suitable system (s), such as the server 106.

As shown in FIG. 4A, the image frame 410 captures a very dark scene, namely a scene with a person sitting on a staircase. Part of the process 300 can involve increasing the brightness of the image frame 410 and applying the machine learning model 280 in order to reduce image distortion and noise in the image data. The result is the image frame 420, which captures the same scene but at a higher brightness level. As can be seen here, the image frame 420 is bright, clear, and includes minimal noise.

Although FIGS. 4A and 4B illustrate one example of image processing results obtained using a trained machine learning model, various changes may be made to FIGS. 4A and 4B. For example, the contents of the image frames shown in FIGS. 4A and 4B are for illustration only and can easily vary based on the scene being imaged. Also, the results shown in FIGS. 4A and 4B are merely meant to illustrate one example of the type of results that may be obtained by training and using a machine learning model 280 as described above.

Figure 5:
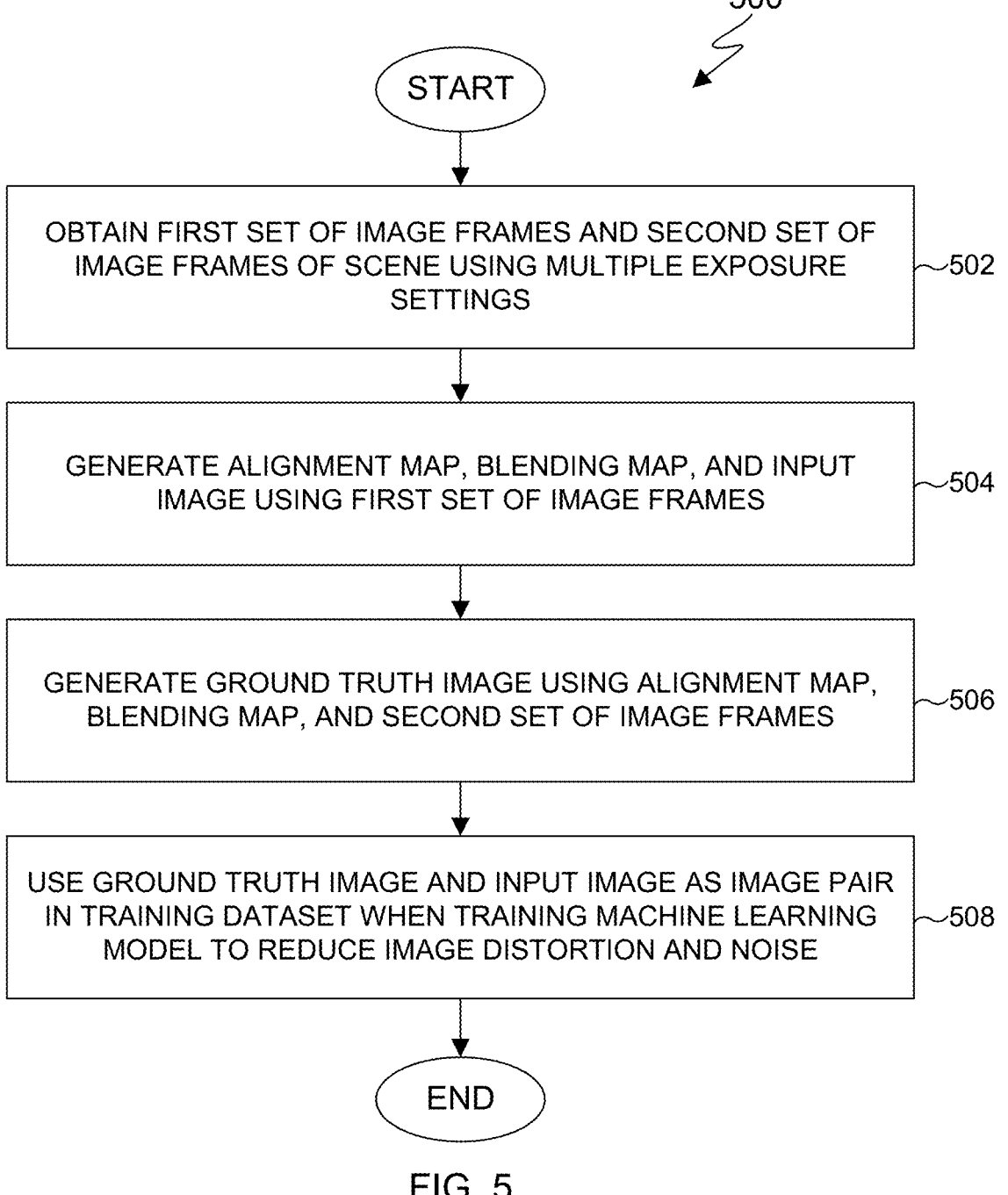
FIG. 5 illustrates an example method for generating training data in accordance with this disclosure.

FIG. 5 illustrates an example method 500 for generating training data in accordance with this disclosure. For ease of explanation, the method 500 is described as being performed by the server 106 in the network configuration 100 shown in FIG. 1. However, the method 500 could be performed using any other suitable device(s) and in any other suitable system (s), such as when performed by the electronic device 101.

As shown in FIG. 5, multiple image frames of a scene are obtained at step 502. This could include, for example, the processor 120 of the server 106 obtaining image frames 210 and 220 captured using a multi-frame capture operation, which may or may not include the use of different exposure settings. If used, different exposure settings can include different exposure times, different ISO values, or both. In some embodiments, a first set of image frames 210 and a second set of image frames 220 can be captured, possibly using different ISO values. For example, the first set of image frames 210 may be captured using one or more ISO values that are higher than one or more ISO values used for the second set of image frames 220.

An alignment map, a blending map, and an input image are generated using the first set of image frames at step 504. This could include, for example, the processor 120 of the server 106 performing the MFP modeling operation 230 to produce the alignment map 233, the blending map 237, and the input image 240. For example, the processor 120 of the server 106 may generate the alignment map 233 using the first set of image frames 210 and apply the alignment map 233 to the first set of image frames 210 to generate aligned image frames 210a. The processor 120 of the server 106 may also identify motion between the aligned image frames 210a, such as based on a pixel-by-pixel analysis of the aligned image frames 210a. The processor 120 of the server 106 may further generate the blending map 237 based on the identified motion between the aligned image frames 210a and blend the aligned image frames 210a using the blending map 237 to generate the input image 240.

A ground truth image is generated using the alignment map, the blending map, and the second set of image frames at step 506. This could include, for example, the processor 120 of the server 106 performing the MFP modeling operation 230 to produce the ground truth image 250. For example, the processor 120 of the server 106 may apply the alignment map 233 (which was generated using the first set of image frames 210) to the second set of image frames 220 to generate another set of aligned image frames 220a. The alignment map 233 provides a common alignment for the ground truth image 250 and the input image 240. The processor 120 of the server 106 may also apply the blending map 237 (which was generated using the first set of aligned image frames 210a) to the second set of aligned image frames 220a to generate the ground truth image 250. The blending map 237 provides a common level of brightness for the ground truth image 250 and the input image 240.

The ground truth image and the input image are used as an image pair in a training dataset for training a machine learning model to reduce image distortion and noise at step 508. This could include, for example, the processor 120 of the server 106 performing the machine learning model training operation 270 in order to train the machine learning model 280 using the training dataset 260.

Although FIG. 5 illustrates one example of a method 500 for generating training data, various changes may be made to FIG. 5. For example, while shown as a series of steps, various steps in FIG. 5 may overlap, occur in parallel, occur in a different order, or occur any number of times.

Figure 6:
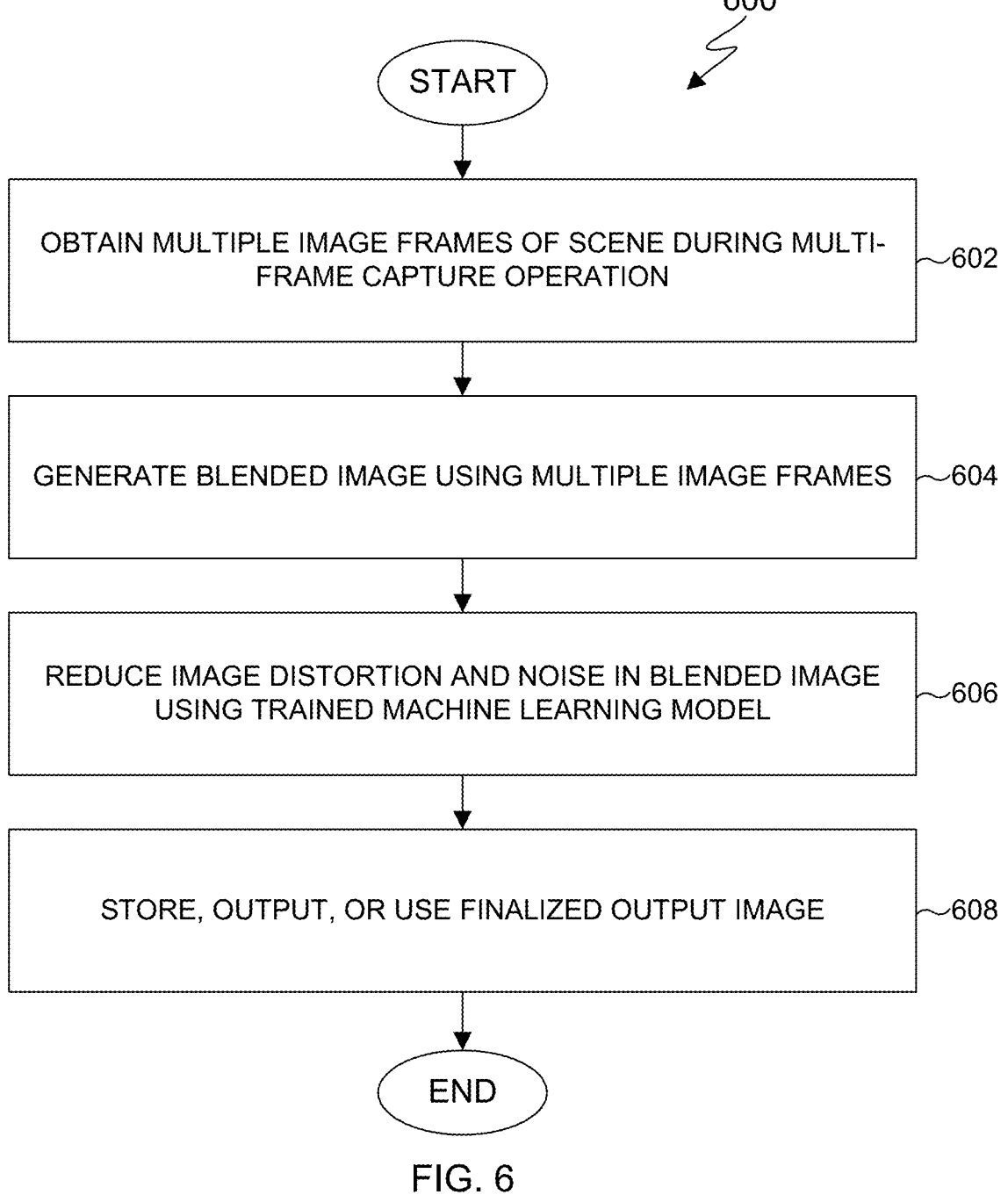
FIG. 6 illustrates an example method for image processing in accordance with this disclosure.

FIG. 6 illustrates an example method 600 for image processing in accordance with this disclosure. For ease of explanation, the method 600 is described as being performed by the electronic device 101 in the network configuration 100 shown in FIG. 1. However, the method 600 could be performed using any other suitable device(s) and in any other suitable system (s), such as when performed by the server 106.

As shown in FIG. 6, multiple image frames of a scene are obtained using at least one imaging sensor at step 602. This could include, for example, the processor 120 of the electronic device 101 obtaining image frames 310 captured via one or more sensors 180 using a multi-frame capture operation, which may or may not include the use of different exposure settings. If used, different exposure settings can include different exposure times, different ISO values, or both. The multiple image frames 310 include at least a first image frame and a second image frame.

An MFP operation is performed to generate a blended image using the multiple image frames at step 604. This could include, for example, the processor 120 of the electronic device 101 performing the MFP operation 320 to generate a blended image frame based on the image frames 310. For example, the processor 120 of the electronic device 101 may align the image frames 310 based on an alignment map and blend the aligned image frames based on a blending map.

Image distortion and noise in the blended image are reduced using a trained machine learning model at step 606. This could include, for example, the processor 120 of the electronic device 101 performing the image processing operation 330 using the trained machine learning model 280. The machine learning model 280 can be trained using the method 500 described above. Thus, the machine learning model 280 can be trained using multiple image pairs, where each image pair includes (i) an input image 240 generated from a first set of image frames 210 using an alignment map 233 and a blending map 237 generated from the first set of image frames 210 and (ii) a ground truth image 250 generated from a second set of image frames 220 using the alignment map 233 and the blending map 237. The finalized image produced by the machine learning model 280 (and optionally via post-processing) can be stored, output, or used in some manner at step 608. This could include, for example, the processor 120 of the electronic device 101 displaying the processed image frame 350 on the display 160 of the electronic device 101. This could also include the processor 120 of the electronic device 101 saving the processed image frame 350 to a camera roll stored in a memory 130 of the electronic device 101. This could further include the processor 120 of the electronic device 101 attaching the processed image frame 350 to a text message, email, or other communication to be transmitted from the electronic device 101. Of course, the processed image frame 350 could be used in any other or additional manner.

Although FIG. 6 illustrates one example of a method 600 for image processing, various changes may be made to FIG. 6. For example, while shown as a series of steps, various steps in FIG. 6 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for training data generation, the method comprising:

obtaining a first set of image frames of a scene and a second set of image frames of the scene using multiple exposure settings, the first set of image frames having higher noise than the second set of image frames;

generating an alignment map and a blending map using the first set of image frames;

generating an input image using the alignment map, the blending map and the first set of image frames;

generating a ground truth image using the alignment map, the blending map, and the second set of image frames; and using the ground truth image and the input image as an image pair in a training dataset when training a machine learning model to reduce image distortion and noise.

2. The method of claim 1, wherein generating the alignment map and the blending map comprises:

performing a multi-frame processing operation to generate the alignment map and the blending map using the first set of image frames.

3. The method of claim 1, wherein generating the alignment map and the blending map comprises:

aligning the first set of image frames to generate the alignment map;

applying the alignment map to the first set of image frames to generate aligned image frames;

identifying motion between the aligned image frames; and generating the blending map based on the identified motion between the aligned image frames.

4. The method of claim 3, wherein generating the input image comprises:

blending the aligned image frames based on the blending map to generate the input image.

5. The method of claim 1, wherein generating the ground truth image comprises:

applying the alignment map to the second set of image frames to generate aligned image frames; and blending the aligned image frames based on the blending map to generate the ground truth image.

6. The method of claim 1, wherein:

the first set of image frames is captured using one or more ISO values; and the second set of image frames is captured using at least one ISO value that is lower than the one or more ISO values.

7. The method of claim 1, wherein:

the alignment map provides a common alignment for the ground truth image and the input image; and the blending map provides a common brightness level for the ground truth image and the input image.

8. An electronic device comprising:

at least one processing device configured to:

obtain a first set of image frames of a scene and a second set of image frames of the scene using multiple exposure settings, the first set of image frames having higher noise than the second set of image frames;

generate an alignment map and a blending map using the first set of image frames;

generate an input image using the alignment map, the blending map, and the first set of image frames;

generate a ground truth image using the alignment map, the blending map, and the second set of image frames; and use the ground truth image and the input image as an image pair in a training dataset when training a machine learning model to reduce image distortion and noise.

9. The electronic device of claim 8, wherein the at least one processing device is configured to perform a multi-frame processing operation to generate the alignment map and the blending map using the first set of image frames.

10. The electronic device of claim 8, wherein, to generate the alignment map and the blending map, the at least one processing device is configured to:

align the first set of image frames to generate the alignment map;

apply the alignment map to the first set of image frames to generate aligned image frames;

identify motion between the aligned image frames; and generate the blending map based on the identified motion between the aligned image frames.

11. The electronic device of claim 10, wherein, to generate the input image, the at least one processing device is configured to blend the aligned image frames based on the blending map to generate the input image.

12. The electronic device of claim 8, wherein, to generate the ground truth image, the at least one processing device is configured to:

apply the alignment map to the second set of image frames to generate aligned image frames; and blend the aligned image frames based on the blending map to generate the ground truth image.

13. The electronic device of claim 8, wherein:

the first set of image frames is captured using one or more ISO values; and the second set of image frames is captured using at least one ISO value that is lower than the one or more ISO values.

14. The electronic device of claim 8, wherein:

the alignment map provides a common alignment for the ground truth image and the input image; and the blending map provides a common brightness level for the ground truth image and the input image.

15. A non-transitory machine-readable medium containing instructions that when executed cause at least one processor of an electronic device to:

obtain a first set of image frames of a scene and a second set of image frames of the scene using multiple exposure settings, the first set of image frames having higher noise than the second set of image frames;

generate an alignment map and a blending map using the first set of image frames;

generate an input image using the alignment map, the blending map, and the first set of image frames;

generate a ground truth image using the alignment map, the blending map, and the second set of image frames; and use the ground truth image and the input image as an image pair in a training dataset when training a machine learning model to reduce image distortion and noise.

16. The non-transitory machine-readable medium of claim 15, wherein the instructions that when executed cause the at least one processor to generate the alignment map and the blending map comprise:

instructions that when executed cause at least one processor to perform a multi-frame processing operation to generate the alignment map and the blending map using the first set of image frames.

17. The non-transitory machine-readable medium of claim 15, wherein the instructions that when executed cause the at least one processor to generate the alignment map and the blending map comprise:

instructions that when executed cause at least one processor to:

align the first set of image frames to generate the alignment map;

apply the alignment map to the first set of image frames to generate aligned image frames;

identify motion between the aligned image frames; and generate the blending map based on the identified motion between the aligned image frames.

18. The non-transitory machine-readable medium of claim 17, wherein the instructions that when executed cause the at least one processor to generate the input image comprise:

instructions that when executed cause at least one processor to blend the aligned image frames based on the blending map to generate the input image.

19. The non-transitory machine-readable medium of claim 15, wherein the instructions that when executed cause the at least one processor to generate the ground truth image comprise:

instructions that when executed cause at least one processor to:

apply the alignment map to the second set of image frames to generate aligned image frames; and blend the aligned image frames based on the blending map to generate the ground truth image.

20. An electronic device comprising:

at least one imaging sensor; and at least one processing device configured to:

obtain, using the at least one imaging sensor, multiple image frames of a scene during a multi-frame capture operation;

generate a blended image using the multiple image frames; and reduce image distortion and noise in the blended image using a trained machine learning model;

wherein the trained machine learning model is trained using multiple image pairs, each of the image pairs including (i) an input image generated from a first set of image frames using an alignment map and a blending map, the alignment map and the blending map generated from the first set of image frames, and (ii) a ground truth image generated from a second set of image frames using the alignment map and the blending map, the first set of image frames having higher noise than the second set of image frames.

21. The method of claim 1, further comprising:

generating a denoised image using the machine learning model based on a single frame output from a multi-frame processing operation, wherein the denoised image comprises 12-bit or 16-bit RGB data.

* * * * *